Figure 1:
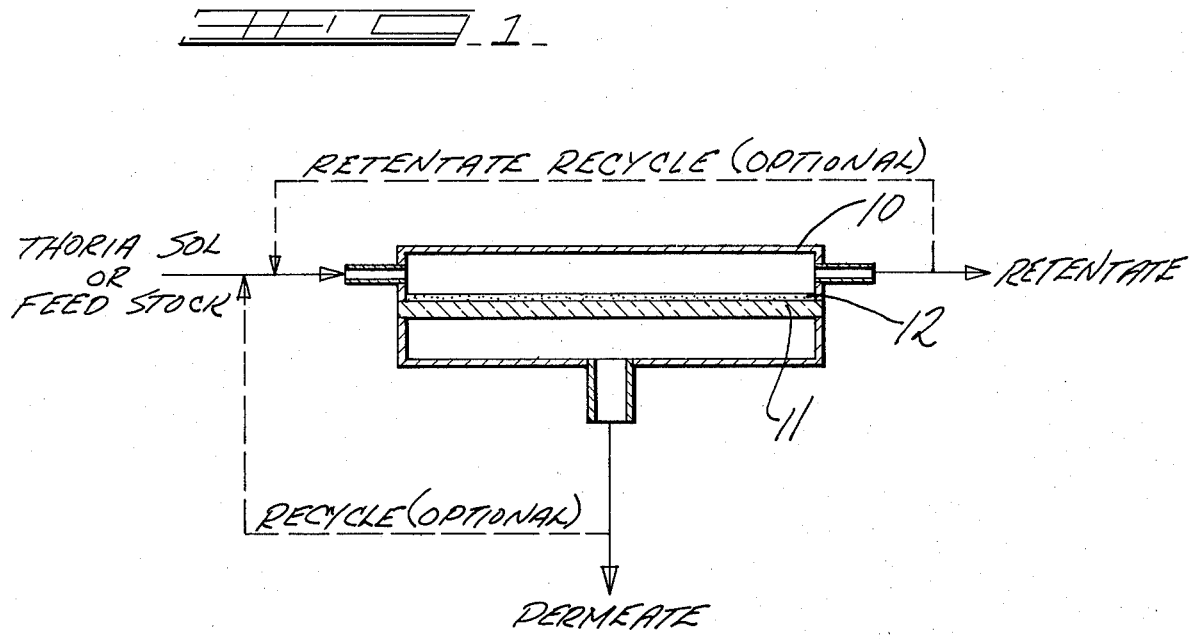

United States Patent [19]

O'Hern, deceased et al.

[11] 3,923,654

[45] Dec. 2, 1975

[54] ULTRAFILTRATION MEMBRANE

[75] Inventors: Harold A. O'Hern, deceased, late of Toledo, Ohio; by William P. Hickey, executor, Monroe County, Mich.

[73] Assignee: Owens-Illinois, Inc., Toledo, Ohio

[22] Filed: May 30, 1974

[21] Appl. No.: 474,691

[52] U.S. Cl............... 210/75; 210/490; 210/500 M; 210/510
[51] Int. Cl............................................ B01d 37/02
[58] Field of Search ............ 210/75, 193, 433, 500, 210/23; 264/48

[56] References Cited
UNITED STATES PATENTS

| | | | |
|---|---|---|---|
| 3,331,772 | 7/1967 | Brownscombe | 210/500 M X |
| 3,373,056 | 3/1968 | Martin | 210/23 X |
| 3,413,219 | 11/1968 | Kraus et al | 210/23 |

*Primary Examiner*—Frank A. Spear, Jr.
*Assistant Examiner*—Ferris H. Lander
*Attorney, Agent, or Firm*—Howard G. Bruss, Jr.; E. J. Holler

[57] ABSTRACT

Disclosed is a method for preparing strong, dimensionally, stable, high flux, anisotropic ultrafiltration membranes by the filtration deposition of a dilute aqueous colloidal thoria sol containing specified proportions of sulfate ion onto a rigid liquid permeable support. The presence of the sulfate during membrane deposition improves the initial solute rejection rate of the resulting membrane as compared to membranes formed when the sulfate ion is absent during deposition.

14 Claims, 2 Drawing Figures

U.S. Patent  Dec. 2, 1975  3,923,654

ULTRAFILTRATION MEMBRANE

The present invention relates to ultrafiltration or reverse osmosis membranes for reducing the concentration of low molecular weight solutes in aqueous solutions. More particularly, the present invention relates to the preparation of a strong, high flux, dimensionally stable, inorganic, anisotropic membrane by filtration deposition of a colloidal thoria sol onto a liquid permeable porous support using sulfate ion as an additive to the sol to improve membrane performance.

Ultrafiltration is a term which includes reverse osmosis and refers to a widely used technique for the separation and concentration of low molecular solutes from aqueous solutions. The term "solution" as used herein is also inclusive of dispersions and suspensions of low molecular weight solutes.

Ultrafiltration is a membrane separation process whereby an aqueous feed stock containing a solute or mixtures of solutes of molecular or colloidal dimensions which are significantly greater than the molecular dimensions of its solvent, is depleted of the solute by being contacted with the membrane at such pressure that the solvent permeates the membrane. This results in a permeate fraction which is solute depleted and a retentate fraction which is solute enriched. Ultrafiltration as used herein is inclusive of reverse osmosis and is characterized by the use of pressure in excess of the osmotic pressure to force the solvent through the membrane. The principles of operation of such ultrafiltration processes are known in the art and are described in the article entitled, "Membrane Separation Process" by Robert E. Lacey appearing in the Sept. 4, 1972 issue of Chemical Engineering, the disclosure of which is incorporated by reference.

Anisotropic membranes for this purpose have been studied in the past. For instance, U.S. Pat. No. 3,449,245 discloses the filtration deposition of an anisotropic membrane using certain water soluble materials. For instance, Example 22 shows the formation of a membrane from a solution of thorium chloride and sodium sulfate. The patent concerns water soluble materials rather than colloidal thoria sols.

U.S. Pat. No. 3,413,219 concerns a method of separating acid from a metal salt using a membrane formed by the filtration deposition of certain colloidal particles on a porous substrate.

U.S. Pat. No. 3,331,772 concerns the preparation of semipermeable membranes by the filtration deposition of an aqueous suspension of clays and resins on a support.

U.S. Pat. No. 3,497,394 concerns a perm-selective membrane comprising a plate like matrix having interconnecting pores between opposing surfaces and a gel of hydrous metal oxide in said interconnecting pores. The porous structure is completely filled so as to define an electrically conductive path through the matrix. In this regard, the membrane is not anisotropic because it exhibits the same properties throughout the membrane.

U.S. Pat. No. 3,537,988 concerns the method for the ultrafiltration of organic solutes from an aqueous phase which contains a membrane forming material such as organic polymers, organic and inorganic ion exchangers, polyelectrolytes and polyvalent metal salts capable of hydrolysis to form hydrous metal oxides.

U.S. Pat. No. 3,556,992 concerns an anisotropic ultrafiltration membrane comprising a porous support layer, a less porous layer integral therewith and an adherent coating of irreversibly compressed gel which adheres to the membrane in the presence of specified high shear conditions.

U.S. Pat. No. 3,400,825 concerns a desalinization cell comprising a rigid core of porous material with an adhering covering of semipermeable membrane. The disclosures of these patents are incorporated herein by reference.

These types of membranes often require prolonged break in periods of several hours where it is necessary to recycle the feed stock to build up the rejection rate of solute to an acceptable level while maintaining a practical capacity in gallons per day per square foot (i.e. gfd) of membrane. The rejection rate is the ratio, expressed as a percentage, of the concentration of solute in the feed stock minus the concentration of solute in the permeate divided by the concentration of solute in the feed stock.

The present invention represents an advance over these types of membranes, particularly those of U.S. Pat. Nos. 3,449,245 and 3,413,219, by providing a rigid, dimensionally stable high-flux, anisotropic, composite, ultrafiltration membrane for use in the ultrafiltration of solute from an aqueous feed stock, wherein thoria is filtration deposited from a dilute, aqueous colloidal thoria sol on a porous, rigid, liquid-permeable support to form said composite membrane wherein the initial solute rejection rate of the membrane is increased by incorporating sulfate ion into said thoria sol in the molar ratio of sulfate ion ($SO_4$) to thorium (Th) of about $0.9 \times 10^{-2}$ to about $4.5 \times 10^{-1}$, and preferably in the ratio of about $1.35 \times 10^{-1}$ to about $3.25 \times 10^{-1}$.

The mechanism for the present improvement is not understood although the description and examples that follow clearly show the results.

Figure 2:
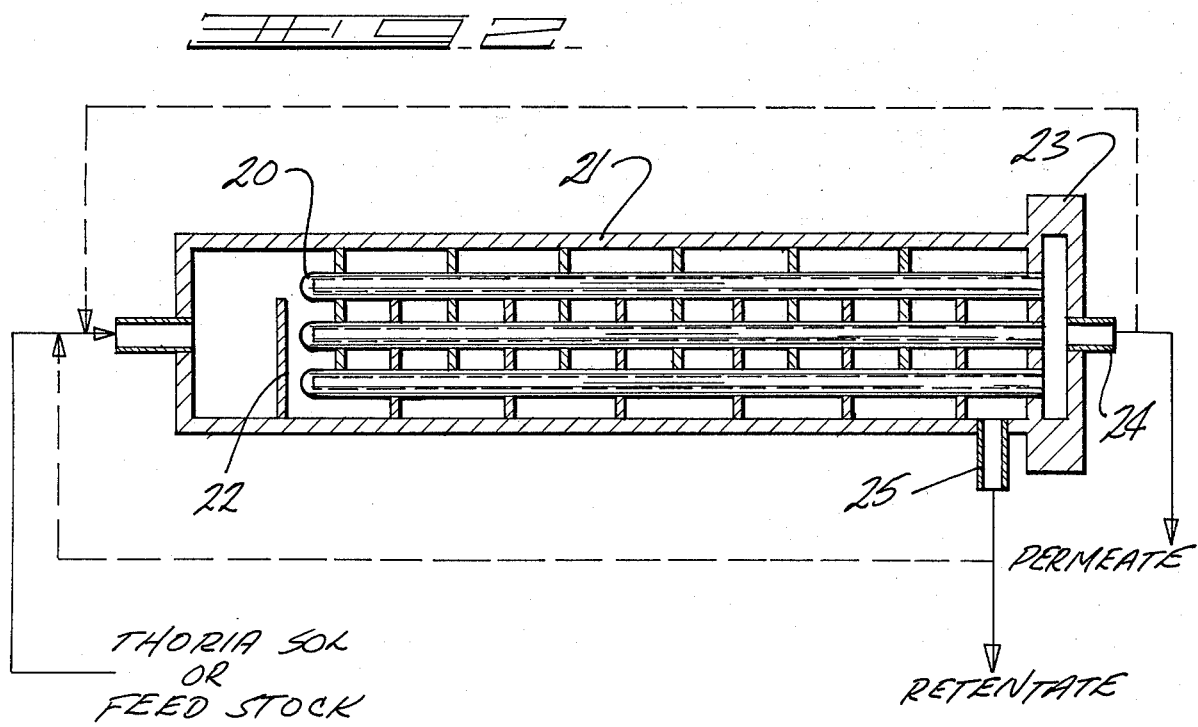

The above and other features of the present invention will be apparent from the following description and drawings wherein FIGS. 1 and 2 are schematic sectional illustrations of process flow diagram for practicing the present invention.

The composition of the porous support is not particularly critical as long as it is inert and dimensionally stable, and is sufficiently porous to accept the filtration deposition of thoria from a thoria sol. The support must be rigid and dimensionally stable at the operation pressure of up to 1,000 psig and higher so that deformation and breakage is not a problem. The porous support can be of any material capable of maintaining its integrity under the pressures involved and in the presence of water and its dissolved salts. The chemical nature of the support is not significant and materials such as metal filters, sintered glass filters, and porous carbon can be used, although compacted and sintered refractory oxide powders are preferred.

It has been found that porous supports having a volume porosity in the range of about 20 to 60 percent and preferably in the range of 30 to 50 percent are quite suitable for the present purposes. The pore size of the support is critical in that it should not be so small as to restrict the filtration deposition of the thoria from the thoria sol. On the other hand, the pore size should not be so large as to permit the unrestricted passage of the thoria particles. Average pore size diameter in the range of about 0.03 micron to about 1.5 microns and preferably about 0.1 micron to about 0.5 microns are suitable for most applications.

The porous support can be formed by compacting and sintering refractory oxide powders such as zirconia powders, thoria powders, powdered clays, spinels and the like, with powdered alumina being preferred for efficiency and economy.

The porous, inert, rigid, dimensionally stable refractory support can be prepared by compacting porous refractory oxide powders to form a green "compact" of the desired configuration. The green compacts are then fired for a time and at a temperature sufficient for sintering to yield the porous, inert, rigid, dimensionally stable refractory support. The sintering should not be at a temperature or for a time which would cause collapsing or coalescing of the particles to form a non-porous body. A convenient indication of the degree of sintering is a comparison of the actual density of the fired compact as compared to the theoretical density of the oxide being fired.

In forming the support from powdered refractory oxide, the powder particle size is selected to yield a sintered compact having a porosity and pore size in the range set forth above. The techniques for compaction and sintering of the porous support form no part of the present invention. Suffice it to say that compacting pressures in the range of 1,000 psi to 10,000 psi, and sintering temperatures in the range of 1,300° to 1,600°C are commercially expedient. Additional details on compacting and sintering of refractory oxide can be obtained from the book "Oxide Ceramics" by E. Ryshkewitch, published in 1960 by Academic Press, New York, N.Y.

Pressed and sintered porous alumina discs having the following characteristics are used as the "discs" in the examples that follow.

diameter — ¾ inches
thickness — 30–70 mils
average pore diameter — 0.1–0.4 microns
maximum pore diameter — 0.3–1.0 microns
porosity — 25–40 percent Extruded and sintered porous alumina tubing having a length from a few inches to several feet, and the following characteristics are also used as the "tubes" in the examples that follow.

outside diameter — 0.3 inches
inside diameter — 0.15 inches
average pore diameter — 0.1–0.45 microns
maximum pore diameter — 0.3–1.0 microns
porosity — 30–45 percent The term colloidal thoria sol is used herein according to its conventional meaning and includes an aqueous dispersion of thoria which exhibits Tyndall effect and Brownian motion as distinguished from true solutions of thorium salts. The sols are dilute in that they have a concentration of $10^{-2}$M to $10^{-5}$ and preferably for efficiency and economy about $10^{-3}$M to about $10^{-4}$M with respect to thorium. Below $10^{-5}$M thorium, the sol is too dilute to be effective while at concentrations above about $10^{-2}$M the sols have a tendency to coagulate and precipitate.

In the usual practice of the present invention, the colloidal thoria sol has an average particle size diameter of from about 15 to about 30 angstroms. Such particles are usually agglomerated in clusters having average aggregate size diameters of from about 30 to about 800 angstroms. Preferably, the aggregate size diameter of the thoria is about 100 angstroms to about 500 angstroms. As a convenient guide to particle size selection, the average thoria aggregate size diameter should be about one-fourth to about one-twentieth and usually about one-fifth to about one-tenth of the average pore size diameter of the porous support for efficient membrane deposition. When the thoria aggregate size diameter is much greater than about 800 angstroms, the membranes tend to be poorly deposited and the rejection is poor.

There are many ways to form a colloidal thoria sol in the art although aqueous hydrolysis of soluble thorium salts such as thorium chloride or thorium nitrate are efficient and practical for the present purposes.

Typical procedures are set forth below. These sols are diluted with water to the desired concentration.

Procedure 1

Thirty-eight point eight (38.8) grams of $ThCl_4 \cdot 8H_2O$ is dissolved in 2,500 ml of deionized water and refluxed for 20 hours.

The resulting colloidal thoria sol has an average thoria particle size of about 200 to 300 angstroms. The sol exhibits Tyndall effect and Brownian motion indicating a true colloidal sol.

Procedure 2

Forty point five (40.5) grams of $Th(NO_3)_4 \cdot 4H_2O$ is dissolved in one liter of deionized water. The resulting solution is added to a stirred reaction flask containing 500 mls of deionized water and 1,000 mls of 0.3 N NaOH. The pH of the resulting solution is adjusted to about 3.5 with HCl and then refluxed for 26 hours to form a colloidal thoria sol having an average thoria particle size of about 200–300 angstroms. The sol exhibits Tyndall effect and Brownian motion indicating a true colloidal sol.

In practicing the present invention, sulfate ion is incorporated after formation but prior to or during the thoria sol deposition in the molar ($SO_4$/Th) ratio of about $0.9 \times 10^{-2}$ to about $4.5 \times 10^{-1}$. In the preferred embodiment, the molar ratio of ($SO_4$/Th) is about $1.35 \times 10^{-1}$ to about $3.25 \times 10^{-1}$ is employed to achieve an increase in the rejection of the membrane. This can be accomplished by dissolving sodium sulfate, lithium sulfate, potassium sulfate, or other soluble alkali sulfate ion salt into the thoria sol after the sol has been formed and prior to or during the membrane deposition.

In practicing the present invention, the concentration of the solute in the feed stock can be reduced regardless of its initial concentration. The types of feed stocks which can be processed include sea water, brackish water, and industrial waste waters including pulp mill and sewage at various stages of its purification processes and other aqueous streams containing undesirable dissolved concentrations of salts such as alkali and alkaline earth sulfates, halides, phosphates, phenolics, and so on.

Referring now to the drawings, FIG. 1 illustrates a schematic process flow diagram for filtration deposition of membranes from a thoria sol and use of such membrane for separation of a feed stock. In FIG. 1 the thoria sol flows into chamber 10 under sufficient pressure to cause an aqueous permeate fraction of the sol to permeate the porous support 11 which is securely positioned in chamber 10. The aqueous permeate is depleted in thoria as compared to the thoria sol. The fraction of the thoria sol which does not permeate the porous support leaves chamber 10 as the retentate stream.

During the initial stages of the deposition, the flux rate in gfd through the membrane is very high and it gradually decreases with time as the thoria is deposited on the porous support. As the thoria deposits the pressure required to cause permeation gradually increases. Deposition pressures in the neighborhood of 500 psig to about 1,500 psig are typical to achieve these results.

Pressure is also observed to be a parameter having an effect on membrane preparation. As the pressure in the deposition system is decreased, the period of time necessary to filtration deposit the thoria is increased.

The flow of the thoria sol through chamber 10 is maintained in the turbulent condition to prevent concentration polarization at the membrane surface. After a few hours of deposition, thin layer 12 of a few microns in thickness of thoria is deposited in the pores and on the surface of support 11 to form the anisotropic membrane. The membrane is characterized as "anisotropic" because the thoria is deposited only on one side of the porous support and the membrane is not uniform throughout.

After the membrane has been deposited, the flow of the thoria sol is discontinued and the feed stock to be processed is introduced into chamber 10. The feed stock separates into a permeate fraction depleted in solute and a retentate fraction enriched in solute. By using the thoria sol containing the specified proportions of sulfate ion as described above, the initial rate of solute rejection from the feed stock is improved while the membrane flux rate is also quite high. In operation with the feed stock, the permeate and/or retentate can be totally or partially recycled as desired for further purification, depending on which stream contains the product to be recovered. Several membranes can be used in various series or parallel arrangements in more complex processes.

FIG. 2 illustrates another type of system similar to FIG. 1 wherein the porous supports are in the form of tubes 20 mounted within shell 21. This design achieves increased membrane surface area. In this embodiment, the thoria sol or feed stock enters shell 21 and flows in a tortuous path defined by baffle plates 22 while in contact with the external surface of tubes 20. The permeate passing through the tubes 20 is collected in header 23 and flows through outlet 24. The retentate which does not permeate the tubes flows from shell 21 through outlet 25. Either of these streams can be partially or totally recycled as required.

The present invention will be illustrated in the following examples wherein all parts are parts by weight and all percentages are weight percentages unless stated otherwise.

EXAMPLES 1-5

A porous alumina tube as described above is mounted in a filtration deposition apparatus as shown in FIG. 2 with total recycle of retentate and permeate. Several aqueous thoria sols prepared from $ThCl_4$ as described above containing thorium in the concentration of $8 \times 10^{-4}M$ and various proportions of $Na_2SO_4$ as indicated in the following table, flow under pressure of about 1,000 psig through the apparatus across the outside surface of the tube. Other sulfate sources such as lithium sulfate or potassium sulfate give substantially similar results. The temperature of the sols is about 85°F. As described above, the circulation of the sol is maintained for 5 to 6 hours to deposit the membrane, although similar results are obtained when the sol is only circulated for about 1 hour to deposit the membrane.

The liquid which permeates through the tube was initially at a rate of in excess of 9,000 g.f.d. At the conclusion of the filtration deposition, the permeation rate of the liquid through the tube is at a rate of about 90 g.f.d.

An aqueous test feed stock having a pH of about 9 and a temperature at 85°F containing 2,000 ppm $Na_2SO_4$ as a solute is then circulated for several hours through the apparatus against the outside surface of the tubes as described above at a pressure of 1,000 psig. The permeate and retentate are totally recycled for test purposes. The results are set forth below as a function of time and concentration of sulfate in the thoria sol used to form the membrane.

| Example No. | 1 | | | 2 | | | 3 | | | 4 | | | 5 | | |
|---|---|---|---|---|---|---|---|---|---|---|---|---|---|---|---|
| molar ratio ($SO_4/Th$) | $0.45 \times 10^{-1}$ | | | $1.8 \times 10^{-1}$ | | | $2.7 \times 10^{-1}$ | | | $3.2 \times 10^{-1}$ | | | $4.5 \times 10^{-1}$ | | |
| time into test (hrs.) | few minutes | ¾ | 20 | few minutes | ¾ | 20 | few minutes | ¾ | 20 | few minutes | ¾ | 20 | few minutes | ¾ | 20 |
| solute rejection rate (%) | | 24 | 78 | | 42 | 91 | | 68 | 93 | | 77 | 93 | | 10 | 65 |
| flux rate (gfd) | 190 | | 225 | 215 | | 217 | 199 | | 176 | 210 | | 173 | 180 | | 257 |

EXAMPLES 6 to 13

Disc type membranes are prepared from the alumina discs described above using the thoria sols of Examples 1 through 5 with various concentrations of $Na_2SO_4$ as indicated below. The feed stock and procecures are the same as for the above examples except that the apparatus of FIG. 1 is employed. The results are set forth below.

It appears from these Examples that the higher rejection rates for the test solute at ¾ hours of testing are achieved for membranes which have been formed using $2.7 \times 10^{-1}$ to $3.2 \times 10^{-1}$ molar ratio of sulfate to thorium is the deposition sol.

| Example No. | 6 | | 7 | | 8 | | 9 | | 10 | |
|---|---|---|---|---|---|---|---|---|---|---|
| molar ratio ($SO_4/Th$) | $0.45 \times 10^{-1}$ | | $1.7 \times 10^{-1}$ | | $2.3 \times 10^{-1}$ | | $2.7 \times 10^{-1}$ | | $4.5 \times 10^{-1}$ | |
| time into test (hrs.) | ¾ | 20 | ¾ | 20 | ¾ | 20 | ¾ | 20 | ¾ | 20 |
| solute rejection rate (%) | 24 | 78 | 42 | 91 | 79 | 93 | 68 | 93 | 10 | 65 |

-continued

| Example No. | 6 | | 7 | | 8 | | 9 | | 10 | |
|---|---|---|---|---|---|---|---|---|---|---|
| flux rate (gfd) | 167 | 98 | 157 | 90 | 111 | 72 | 145 | 88 | 267 | 125 |

To further demonstrate the principles of the present invention, the procedures of Examples 1–5 are repeated using different thoria concentrations in the sol used to deposit the membrane. The results are set forth below.

| Example No. | 11 | | 12 | | 13 | |
|---|---|---|---|---|---|---|
| thorium concentration (M) | $8 \times 10^{-4}$ | | $4 \times 10^{-4}$ | | $2 \times 10^{-4}$ | |
| molar ratio ($SO_4$/Th) | $2.7 \times 10^{-1}$ | | $1.9 \times 10^{-1}$ | | $2.1 \times 10^{-1}$ | |
| time into test (hrs.) | ¾ | 20 | ¾ | 20 | ¾ | 20 |
| solute rejection rate % | 73 | 94 | 39 | 91 | 46 | 91 |
| flux rate (gfd) | 187 | 115 | 234 | 138 | 155 | 107 |

Using the above alumina tubes in the above procedures with thoria sol ($8 \times 10^{-4}$M thorium and with various concentrations of sulfate ion), it was possible to form membranes with adequate rejection rates in as little as one hour when the pressure was maintained at 1,000 psi. Times greater than 6 hours do not appreciably increase the rejecting capabilities of the prepared membranes.

The following table illustrates the initial rejection rate (after a few minutes of operation) for membranes prepared in this fashion as a function of concentration of sulfate ion.

| Molar ratio ($SO_4$/Th) in thoria sol during deposition | Initial rejection rate % of 2000 ppm $Na_2SO_4$ feed stock |
|---|---|
| $0.9 \times 10^{-2}$ | 17 |
| $0.9 \times 10^{-1}$ | 51 |
| $2.2 \times 10^{-1} - 3.3 \times 10^{-1}$ | 85 |
| $4.5 \times 10^{-1}$ | 30 |
| 0.9 | 0 |

To further illustrate the present invention, tubular membranes prepared as in Example 4 are tested by the above procedures with an aqueous feed stock containing about 230 ppm (parts per million) phenol. The pressure is 600 psig and the temperature is 100°F. The pH of the feed stock is increased as indicated below by the addition of NaOH. Average results at steady state conditions are as follows:

| Feed Stock pH | Flux, gfd | % Rejection of Phenol |
|---|---|---|
| 6.4 | 68 | 43 |
| 8.2 | 81 | 46 |
| 9.5 | 93 | 49 |
| 10.9 | 110 | 78 |
| 11.5 | 110 | 86 |
| 12.0 | 110 | 91 |

This test shows the applicability of the present membrane to treating organic compounds as well as inorganic compounds.

Having thus described the invention, what is claimed is:

1. In the process for forming a rigid, dimensionally stable, high-flux, anisotropic, composite, ultrafiltration membrane for use in the ultrafiltration of solute from an aqueous feed stock, wherein thoria is filtration deposited from a dilute, aqueous, colloidal thoria sol on a porous, rigid, liquid-permeable support to form said composite membrane; the improvement for increasing the initial solute rejection rate of said membrane comprising incorporating sulfate ion into said thoria sol in the molar ratio ($SO_4$/Th) of about $0.9 \times 10^{-2}$ to about $4.5 \times 10^{-1}$.

2. The process of claim 1 wherein said sulfate ion is present in the molar ratio ($SO_4$/Th) is about $1.35 \times 10^{-1}$ to about $3.25 \times 10^{-1}$.

3. The process of claim 1 wherein said colloidal sol contains thorium in the concentration of about $10^{-2}$M to about $10^{-5}$M.

4. The process of claim 3 wherein said thorium concentration is about $10^{-3}$M to about $10^{-4}$M.

5. The process of claim 1 wherein said porous support has a porosity of about 20 to about 60 percent.

6. The process of claim 5 wherein said porosity is about 30 to about 50 percent.

7. The process of claim 1 wherein said porous support has an average pore diameter of about 0.03 to about 1.5 microns.

8. The process of claim 7 wherein said average pore diameter is about 0.1 to about 0.5 microns.

9. The process of claim 1 wherein said colloidal thoria sol contains thoria having an average aggregate size diameter of from about 30 angstroms to 800 angstroms.

10. The process of claim 9 wherein said colloidal thoria sol contains thoria having an average aggregate size diameter of from about 100 to about 500 angstroms.

11. The process of claim 1 wherein said support has been formed by compacting and sintering a refractory oxide powder.

12. The process of claim 11 wherein said powder is alumina.

13. The membrane formed by the process of claim 1.

14. The membrane formed by the process of claim 12.

\* \* \* \* \*